(12) United States Patent
Birk et al.

(10) Patent No.: US 12,522,766 B2
(45) Date of Patent: Jan. 13, 2026

(54) METHOD AND SYSTEM FOR IN-SITU REMEDIATION USING SURFACTANT-FREE OIL-IN WATER EMULSION

(71) Applicant: Tersus Environmental LLC, Wake Forest, NC (US)

(72) Inventors: Gary M. Birk, Wake Forest, NC (US); David F. Alden, Worcester, MA (US); Lucas Collin Condes, Norman, OK (US); Michael Taylor Warren, Norman, OK (US); Jeffrey Harry Harwell, Norman, OK (US)

(73) Assignee: Tersus Environmental LLC, Wake Forrest, NC (US)

( * ) Notice: Subject to any disclaimer, the term of this patent is extended or adjusted under 35 U.S.C. 154(b) by 933 days.

(21) Appl. No.: 17/678,687

(22) Filed: Feb. 23, 2022

(65) Prior Publication Data
US 2022/0356400 A1 Nov. 10, 2022

Related U.S. Application Data

(60) Provisional application No. 63/184,365, filed on May 5, 2021.

(51) Int. Cl.
*B01D 19/00* (2006.01)
*B01D 63/02* (2006.01)
(Continued)

(52) U.S. Cl.
CPC .......... *C09K 17/50* (2013.01); *B01D 19/0031* (2013.01); *B01D 19/0036* (2013.01); *B01D 63/02* (2013.01); *B01D 69/02* (2013.01); *B01F 23/4105* (2022.01); *B01F 23/4145* (2022.01); *B09C 1/002* (2013.01); *B09C 1/10* (2013.01); *C02F 3/28* (2013.01); *C09K 8/86* (2013.01); *B01D 2325/38* (2013.01);
(Continued)

(58) Field of Classification Search
CPC ............ B09C 1/10; B09C 1/002; B01D 69/08
See application file for complete search history.

(56) References Cited

U.S. PATENT DOCUMENTS

| 5,643,555 A | 7/1997 | Collin et al. |
| 6,209,855 B1 | 4/2001 | Glassford |

(Continued)

OTHER PUBLICATIONS

Xavier Maymo-Gatell et al., Isolation of a Bacterium That Reductively Dechlorinates Tetrachloroethene to Ethene, www.sciencemag.org., Science vol. 276 Jun. 6, 1997., pp. 1568-1571.

(Continued)

*Primary Examiner* — Nathan A Bowers
(74) *Attorney, Agent, or Firm* — The Belles Group, P.C.

(57) ABSTRACT

A method and a system for in-situ remediation of recalcitrant organic and inorganic contaminants in an environmental medium are disclosed. Dissolved gases from water and an oil are removed to form degassed water and a degassed oil. The degassed water and the degassed oil are mixed to form a surfactant-free oil-in water emulsion. The surfactant-free oil-in-water emulsion is injected into the environmental medium, thereby producing anaerobic conditions to cause indigenous anerobic bacteria to biodegrade residual concentrations of the contaminants in the environmental medium.

19 Claims, 10 Drawing Sheets

(51) Int. Cl.
  *B01D 69/02*   (2006.01)
  *B01F 23/41*   (2022.01)
  *B09C 1/00*    (2006.01)
  *B09C 1/10*    (2006.01)
  *C02F 3/00*    (2023.01)
  *C02F 3/28*    (2023.01)
  *C09K 8/86*    (2006.01)
  *C09K 17/50*   (2006.01)
  *C02F 101/00*  (2006.01)
  *C02F 101/38*  (2006.01)
  *C02F 103/06*  (2006.01)

(52) U.S. Cl.
  CPC .... *B09C 2101/00* (2013.01); *C02F 2101/003* (2013.01); *C02F 2101/38* (2013.01); *C02F 2103/06* (2013.01)

(56) References Cited

U.S. PATENT DOCUMENTS

| | | | |
|---|---|---|---|
| 7,387,661 B2* | 6/2008 | Wu | B01D 53/22 95/45 |
| 7,537,200 B2 | 5/2009 | Glassford | |
| 7,696,252 B2 | 4/2010 | Pashley | |
| 2003/0116015 A1* | 6/2003 | Sengupta | B01D 19/0031 96/6 |
| 2004/0043474 A1* | 3/2004 | Newman | B09C 1/002 435/262.5 |
| 2005/0096398 A1 | 5/2005 | Pashley | |
| 2009/0130151 A1 | 5/2009 | Pashley | |
| 2011/0139695 A1* | 6/2011 | Borden | B09C 1/002 210/170.07 |
| 2012/0305479 A1* | 12/2012 | Falatko | C02F 3/28 210/610 |
| 2018/0361443 A1* | 12/2018 | Mork | B09C 1/08 |

OTHER PUBLICATIONS

Department of Defense (ESTCP) Environmental Security Technology Certification Program, Protocol for Enhanced In Situ Bioremediation Using Emulsified Edible Oil., Prepared by: Solutions—IES Industrial & Environmental Services, May 2006, pp. 1-99.

* cited by examiner

METHOD AND SYSTEM FOR IN-SITU REMEDIATION USING SURFACTANT-FREE OIL-IN WATER EMULSION

CROSS-REFERENCE TO RELATED APPLICATIONS

This application claims priority to U.S. Provisional Patent Application No. 63/184,365, filed on May 5, 2021, the entire disclosure of which is incorporated herein by reference.

TECHNICAL FIELD

The present disclosure generally relates to a method and a system for in-situ remediation of an environmental medium, more particularly relates to a method and a system for in-situ remediation of the environmental medium using a surfactant-free oil-in-water emulsion.

BACKGROUND

Ground water contamination is a major leading environmental issue and results from accidental, unknowing, or clandestine release of chemicals that infiltrate into the subsurface of the soil. Chlorinated solvents such as chlorinated methanes, ethanes, and ethenes are a common class of chemicals that contaminate the ground water and include contaminants such as carbon tetrachloride (CT), 1,1,1-Trichloroethane (TCA), perchloroethene (PCE), trichloroethene (TCE), and vinyl chloride (VC). Further, explosives such as nitroaromatics, nitramines, nitrate esters, and energetic munitions residuals; nitrates; perchlorate derivatives; and oxidized metals also contribute to the ground water contamination. These contaminants must be eliminated to protect human health and the environment and to potentially restore the hazardous sites to comply with the regulations.

Bio-stimulation is a bioremediation method that promotes favorable microbial activity to decontaminate the ground water. There are many types of organisms in soils and aquifers and dominance of one microbial process over another is influenced by several factors. These factors include availability, type and concentration of electron acceptors and electron donors, temperature, pH, concentration and nature of chlorinated solvents or other volatile organic compounds, and other potentially inhibitory contaminants or elements.

Emulsified vegetable oils (EVO) have been used as a carbon source to stimulate organohalide-respiring bacteria that mineralize the chlorinated solvents. The triglycerides of the EVO may get anaerobically fermented to hydrogen and low-molecular weight fatty acids by common subsurface microorganisms. Later, a more specialized population of microbes known as organohalide respiring bacteria use hydrogen as the sole electron donor during dehalorespiration, a process that effectively replace the halogen (i.e., chlorine atoms in solvent molecules) with a hydrogen ion. This process is thus also referred to as reductive dechlorination. Under appropriate conditions, the contaminants may completely be dechlorinated to innocuous end products such as ethene, ethane and methane.

Vegetable oils are hydrophobic at a molecular level because they contain a fraction that repels water. To improve the distribution of vegetable oils in soil or in aquifers, the vegetable oils are emulsified with the addition of a third component, typically surfactants, polymers, or certain surface treated particles. The addition of these components stabilizes the colloidal oil droplets so that coagulation, coalescence, and phase separation in the aqueous dispersion is reduced. The stability of the formed emulsion is governed by interactions between the dispersed particles by balancing destabilizing inter-droplet van der Waals attractions and repulsive electrostatic forces. The formed emulsions allow the oil to disperse with water in the form of micelles.

The electron donor is packaged as an oil-in-water emulsion containing 25 to 50% water. Water is thus inherently purchased during EVO sales. The current practice is to provide the substrate as an EVO that contains 25 to 50% water. The substrate is purchased from a supplier and shipped to the contaminated site. Typical dilution ratios range from one-part EVO to four parts water to one-part EVO to 100 parts water. Additional chase water is often added to aid with the distribution of EVO in aquifers. The costs of the electron donor may be a significant fraction of total process costs. Thus, the selection of an efficient and low-cost electron donor is important to the efficacy and overall economics of these systems.

Conventional EVO technologies that are used for remediation of contaminated sites are often expensive, may require years to perform, and are not effective. Hence, there is a need for an effective technology that can treat the soil by in-situ bioremediation.

SUMMARY

In one aspect, a method for in-situ remediation of recalcitrant organic and inorganic contaminants in an environmental medium is disclosed. The method includes removing dissolved gases from water to form degassed water and removing dissolved gases from an oil to form a degassed oil. The degassed water and the degassed oil are mixed to form a surfactant-free oil-in water emulsion. The surfactant-free oil-in-water emulsion is injected into the environmental medium, thereby producing anaerobic conditions to cause indigenous anerobic bacteria to biodegrade residual concentrations of the contaminants in the environmental medium. The environmental medium is soil or ground water.

In another aspect, a system for in-situ remediation of recalcitrant organic and inorganic contaminants in an environmental medium is disclosed. The system includes a membrane contactor for removing dissolved gases from water to form degassed water. The system further includes a rigid enclosure operating under a vacuum for removing dissolved gases from an oil to form a degassed oil. A mixer is provided to mix the degassed water and the degassed oil to form a surfactant-free oil-in-water emulsion. The surfactant-free oil-in-water emulsion is injected into the environmental medium using an injection manifold for in-situ remediation of the recalcitrant organic and inorganic contaminants in the environmental medium.

BRIEF DESCRIPTION OF THE DRAWINGS

The features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

Figure 1:
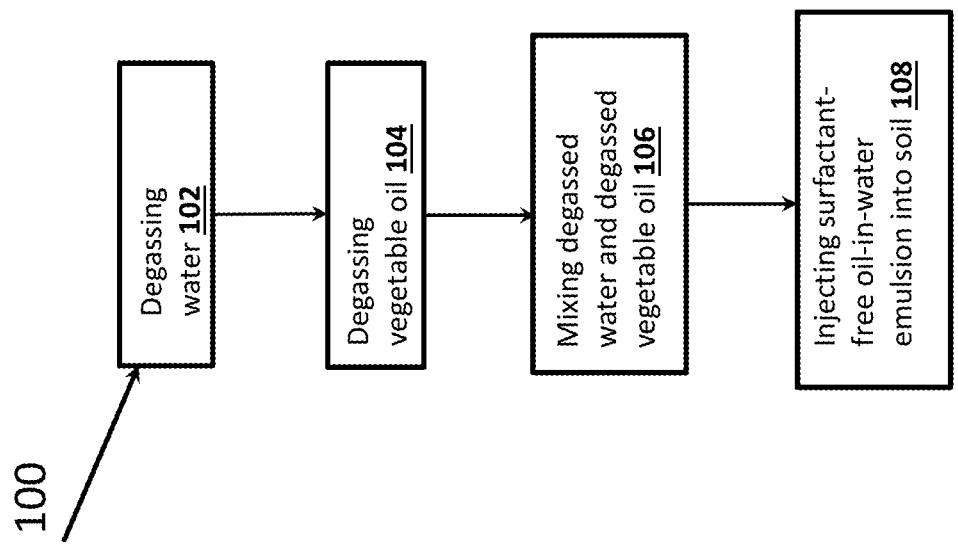
FIG. 1 is a flow chart illustrating a method for in-situ remediation of a contaminated soil.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying figures.

The present disclosure discloses a method for anaerobic bioremediation of contaminants in a soil surface and in an aquifer. Further, a method for formulating a stable surfactant-free oil-in-water emulsions and injecting it into the soil or into the aquifer for bioremediation of contaminated soils or aquifers is disclosed. The dissolved gases are removed from the water and the oil to degas them. The degassed water is mixed with the degassed oil to form a surfactant-free oil-in-water emulsion. The surfactant-free oil-in-water emulsion is formulated without the addition of a third component such as surfactants, polymers, or certain surface treated particles. The mixture of degassed water and degassed oil forms a colloidal suspension (surfactant-free oil-in-water emulsion) that is stable for hours to several days. Injecting the surfactant-free oil-in-water emulsion into the soil or into the aquifer improves the distribution of fatty acids in the soil or the aquifer that is to be decontaminated.

As shown in FIG. 1, the method 100 is for in-situ remediation of recalcitrant organic and inorganic contaminants in an environmental medium. At step 102 the water is degassed, which is followed by step 104 where the oil is degassed. The degassed water and the degassed oil are mixed at step 106 to form a surfactant-free oil-in-water emulsion. At step 108, the surfactant-free oil-in-water emulsion is injected into the environmental medium to be decontaminated. In one embodiment, the environmental medium is soil or ground water.

Figure 2:
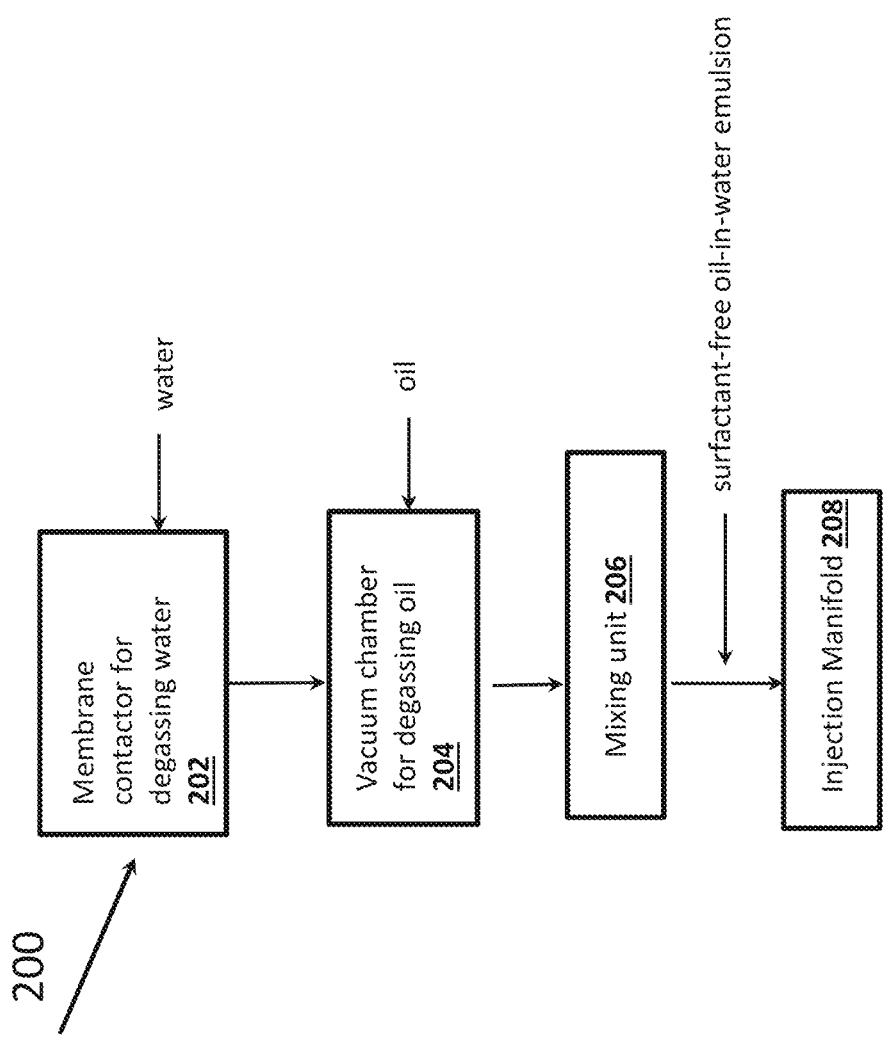
FIG. 2 is a schematic representation of a system for in-situ remediation of a contaminated soil.

FIG. 2 is a schematic representation of a system 200 for in-situ remediation of a contaminated environmental medium. The system 200 includes a membrane contactor 202 for degassing water. The system 200 further includes a vacuum chamber 204 for degassing an oil. The degassed water and the degassed oil are mixed in a mixing unit 206 to form a surfactant-free oil-in-water emulsion. The surfactant-free oil-in-water emulsion is injected into the environmental medium using an injection manifold 208.

Figure 3:
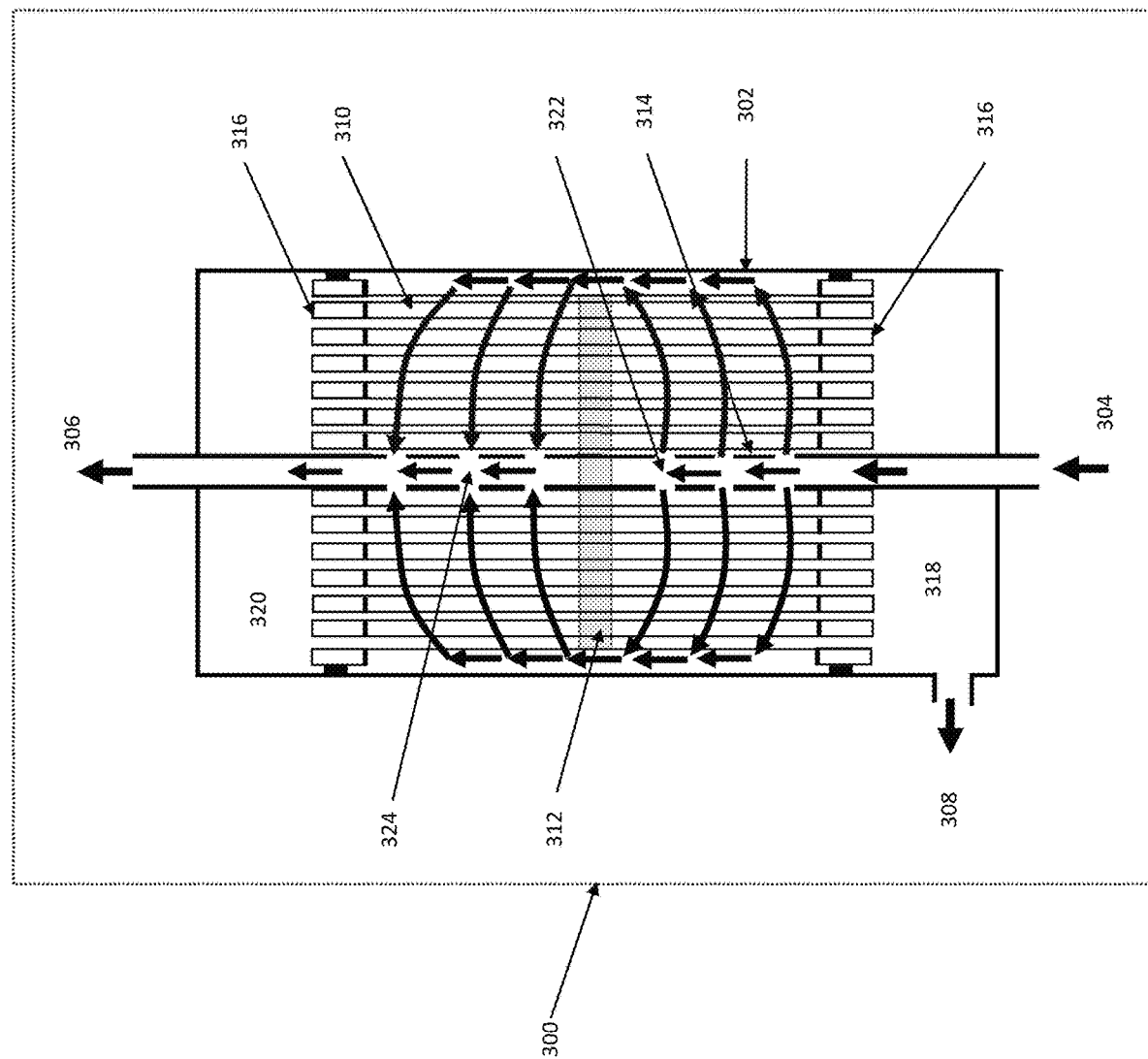
FIG. 3 is a diagrammatic, sectional side view of a membrane contactor for degassing water.

FIG. 3 is a diagrammatic, sectional side view of the membrane contactor 300 for degassing water. The membrane contactor 300 includes a casing 302 having a water inlet 304, a degassed water outlet 306, and a vacuum port 308.

Figure 4:
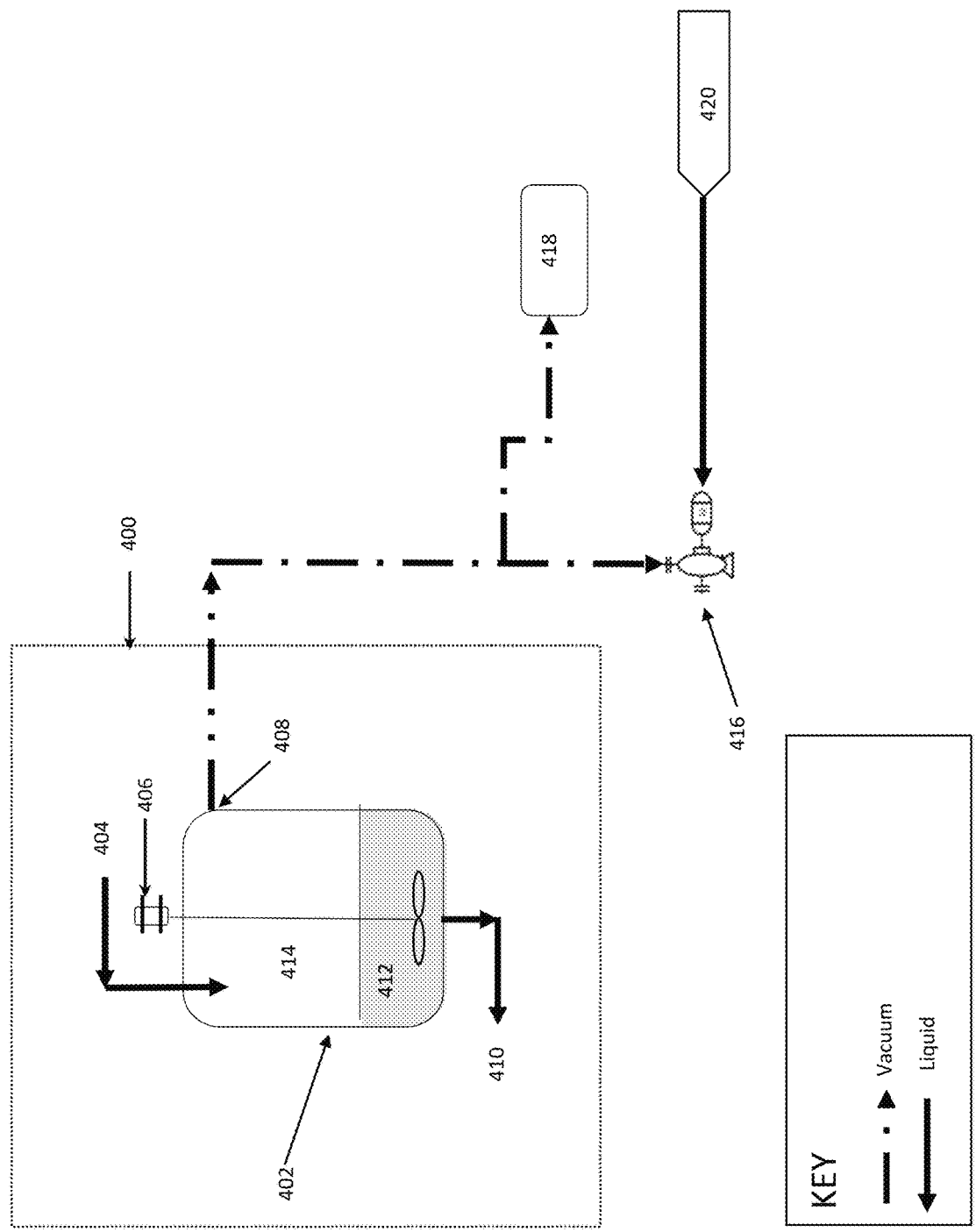
FIG. 4 is a diagrammatic representation of a vacuum chamber for degassing an oil.

FIG. 4 is a diagrammatic representation of the vacuum chamber 400 from which dissolved gases are removed from the oil. The vacuum chamber 400 includes a rigid enclosure 402 with an oil inlet 404, an optional mixer 406 to stir the contents of the rigid enclosure 402, a vacuum exit port 408, and a degassed oil outlet 410.

Figure 5:
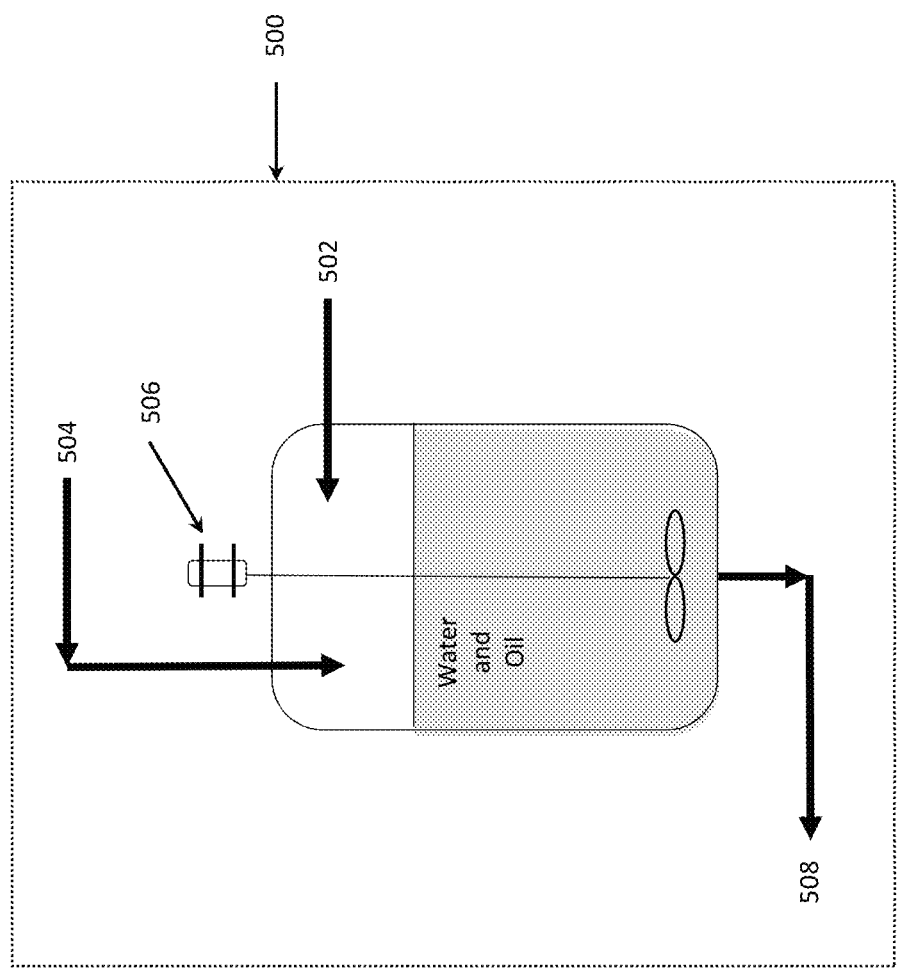
FIG. 5 is a diagrammatic representation of a mixing unit for mixing a degassed water and a degassed oil.

FIG. 5 is a diagrammatic representation of the mixing unit 500 for homogenizing the degassed water 502 and the degassed oil 504. The mixing unit 500 includes mixing technology 506 consisting of either a shear or a mechanical action.

Figure 6:
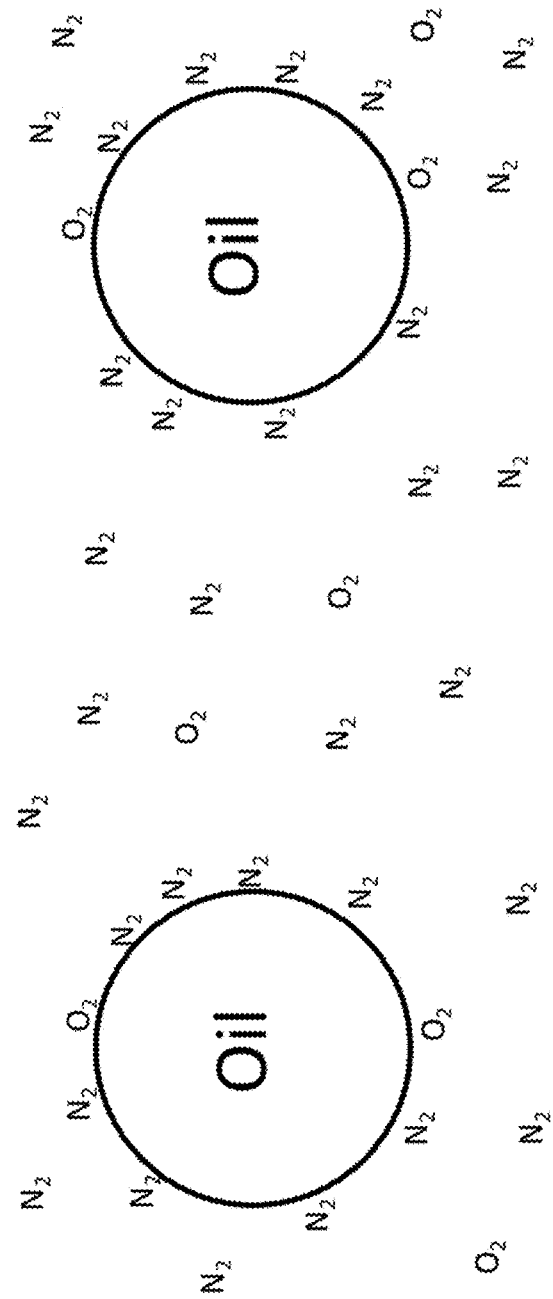
FIG. 6 is a schematic illustration of a dissolved gas in water and an oil.
Figure 7:
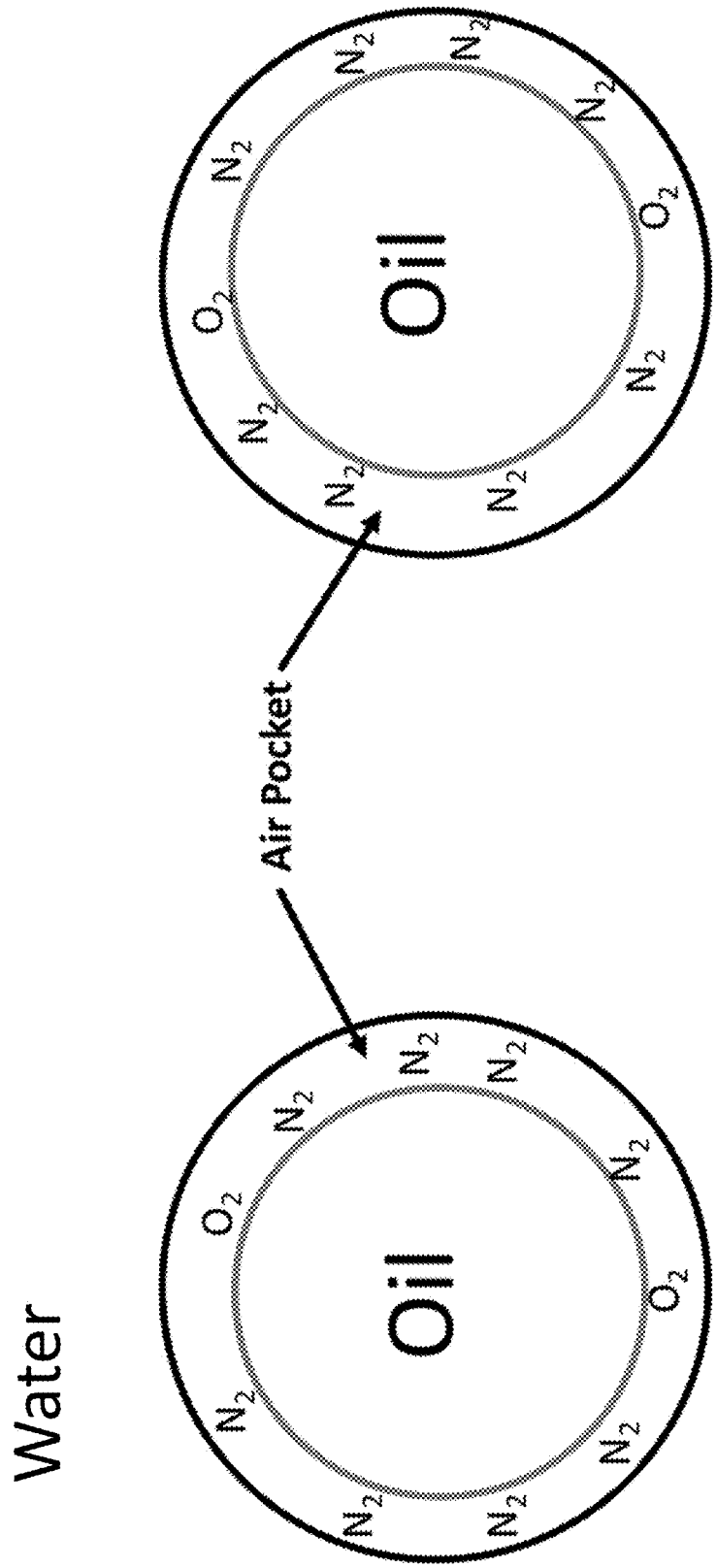
FIG. 7 illustrates a phenomenon of dissolved gas adsorbing to the surface of oil forming an air pocket.
Figure 8:
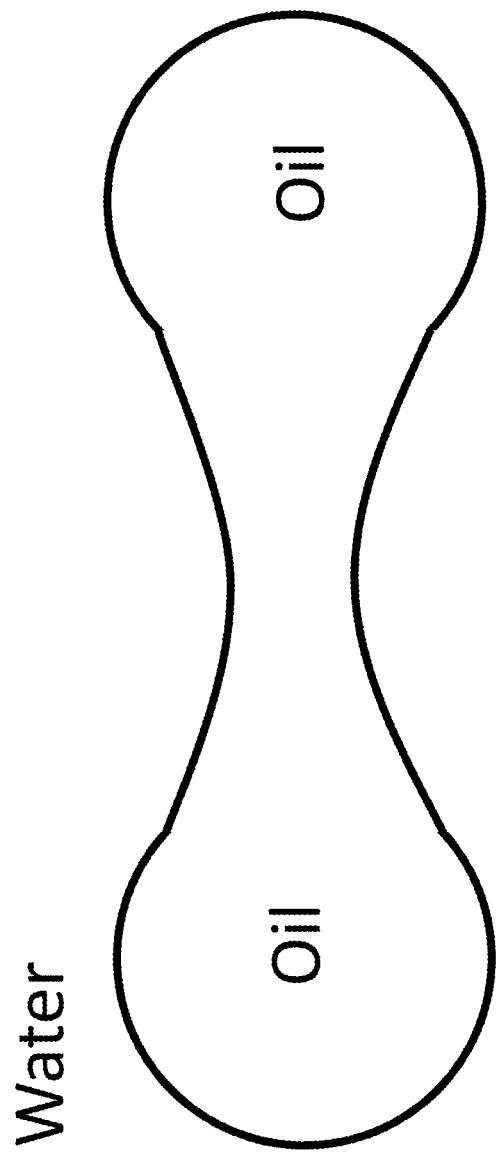
FIG. 8 illustrates a phenomenon of surface tension pushing oil droplets together to form one big droplet.

FIG. 6 illustrates a dissolved gas present in water that is mixed with an oil. Interfacial properties of water are known to be affected by dissolved gases (i.e., oxygen, nitrogen, etc.). FIG. 7 illustrates a phenomenon of the dissolved gas adsorbing to the surface of the oil forming an air pocket. FIG. 8 illustrates a phenomenon of surface tension pushing oil droplets together to form one big droplet. Cavitation occurs because the interfacial free energy between the hydrophobic surface and the vapor is lower than that between the surface and water as illustrated in FIGS. 6, 7, and 8. The dissolved gas adsorbs to the surface of the oil forming an air pocket and leads to hydrophobic interactions, reducing the energy for oil droplets to form one big droplet. By removing the nucleation sites provided by the dissolved gases, the hydrophobic interaction forces would be reduced. In a gas free system, oil droplets break away from the oil-water interface and generate fine dispersions.

Figure 9:
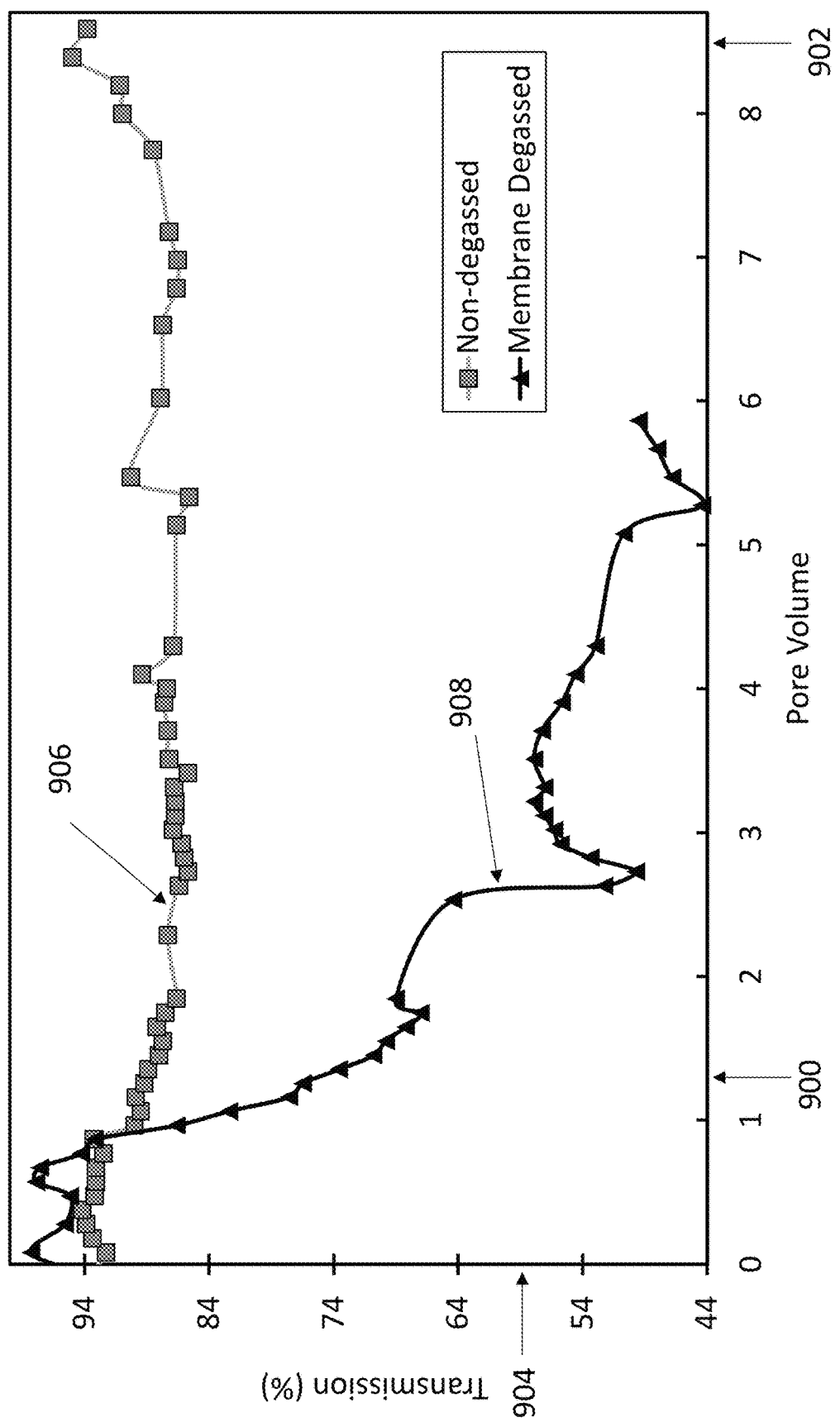
FIG. 9 is a graph illustrating variation of % transmittance with pore volume for a degassed and a non-degassed emulsion.

FIG. 9 is a graph 900 illustrating variation of % transmittance with pore volume for a degassed and a non-degassed emulsion. The degassed emulsion is the surfactant-free oil-in-water emulsion. Pore Volume (PV) is volume (ml) of water or solution passed through a saturated porous media packed of a certain volume ($cm^3$). Specifically these runs had a pore volume of 5 ml water to breakthrough a one inch column of saturated porous media. Every PV is assumed to be of similar volume. The x-axis 902 represents the pore volume, while the y-axis 904 represents % transmittance. 906 represents variation of % transmittance with pore volume for a non-degassed sample, i.e., an emulsion prepared without degassing the water and the oil. 908 represents variation of % transmittance with pore volume for a degassed sample, i.e., a surfactant-free oil-in-water emulsion prepared after degassing the water and the oil.

Figure 10:
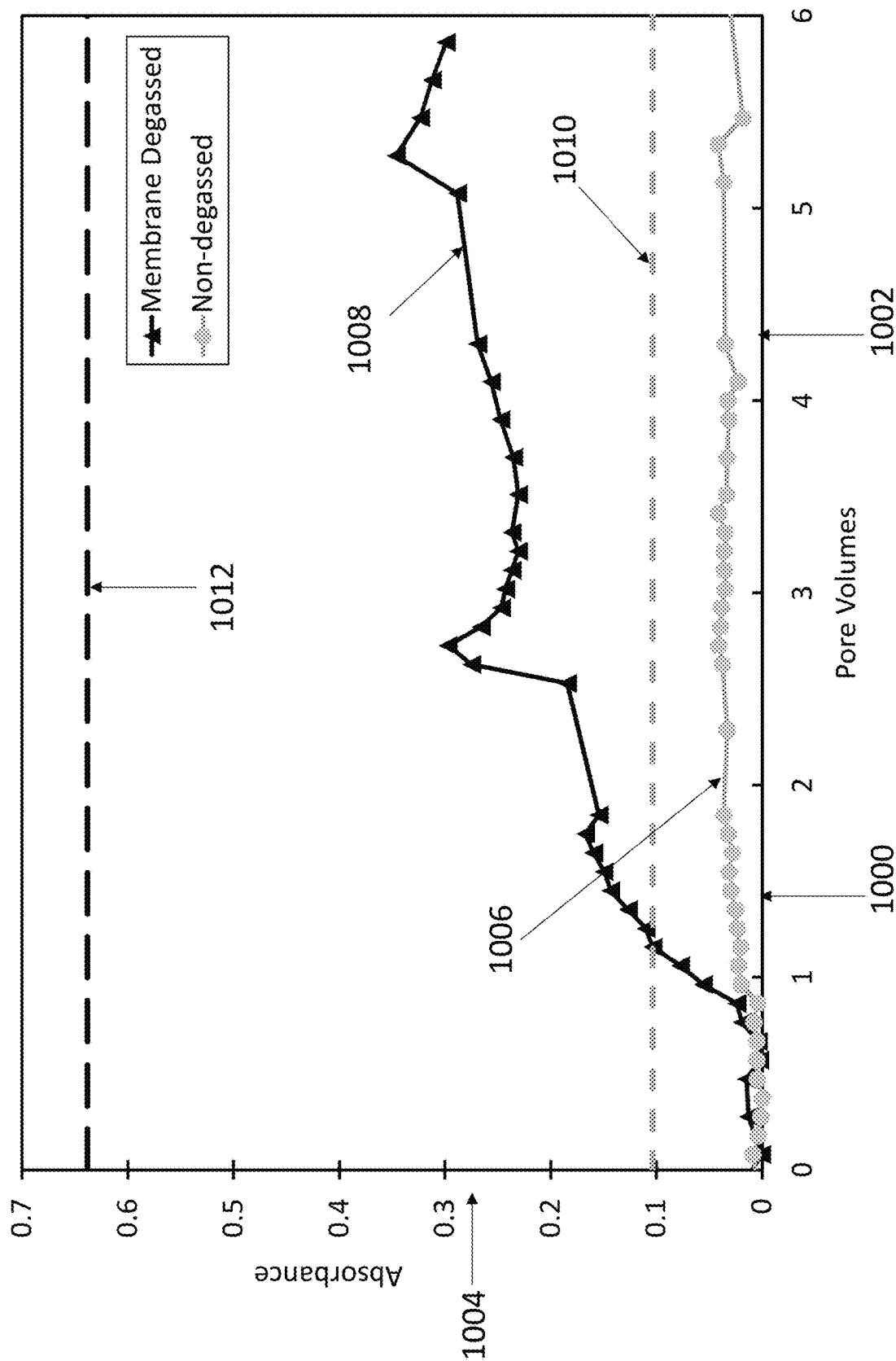
FIG. 10 is a graph illustrating variation of absorbance with pore volume for a degassed and a non-degassed emulsion.

FIG. 10 is a graph 1000 illustrating variation of absorbance with pore volume for a degassed and a non-degassed emulsion. The x-axis 1002 represents the pore volume, while the y-axis 1004 represents absorbance. 1006 represents variation of absorbance with pore volume for a non-degassed sample, i.e., an emulsion prepared without degassing the water and the oil. 1008 represents variation of absorbance with pore volume for a degassed sample, i.e., a surfactant-free oil-in-water emulsion prepared after degassing the water and the oil. The dashed line 1010 is the absorbance of the non-degassed sample directly after preparation and before passing through the column and the dashed line 1012 is the absorbance of the degassed sample directly after preparation before passing through the column.

Hydroxyl ($OH^-$) ions are generated by self-ionization of water in which a water molecule, $H_2O$, deprotonates (loses the nucleus of one of its hydrogen atoms) to become a hydroxide ion, $OH^-$. Degassing of water prevents cavitation and facilitates the breakaway of oil droplets when they combine with water. These oil droplets absorb $OH^-$ ions at the oil-water interface. The absorbed $OH^-$ ions provide a repulsive barrier to coagulation. pH has an impact on stability of the emulsion. Acidic water produces an unstable emulsion. pH values from neutral to about 11 are preferred. This is consistent with $OH^-$ adsorption stabilization mechanism.

In an embodiment, the present disclosure provides that based on the geochemistry of the water and contaminated site, the water may be modified with addition of a buffer to adjust the pH between 7.0 to 11 to screen double-layer repulsions and reduce any electrostatic barrier to droplet coagulation. Water with elevated electrolyte (i.e., sodium chloride) concentrations such as brackish water is expected to screen double-layer repulsions for adsorbed $OH^-$, thus reducing the electrostatic barrier to droplet coagulation.

In an embodiment, the present disclosure provides a method for removing dissolved gases from water by using a gas-permeable membrane in combination with vacuum.

The water is degassed in a membrane contactor 300. Contact is the key to membrane degassing of water. Microporous hollow fibers 310 are used to increase the contact area. The membrane contactor 300 has a casing 302 with an inlet 304 and an outlet 306. The water with dissolved gases is let into the membrane contactor through the inlet 304. The degassed water is let out through the outlet 306. The membrane contactor includes a center baffle 312 positioned in the casing 302. Microporous hollow fibers 310 are knitted into a membrane and the membrane is wound around a central distribution and collection tube 314. The microporous hollow fibers 310 have exposed open ends 316 to plenum chambers 318 and 320. The central distribution and collection tube 314 provides the water inlet 304 and outlet 306. The central distribution and collection tube 314 has liquid distribution ports 322 on the inlet side of the center baffle 312 and liquid collection ports 324 on the discharge side of the center baffle 312. As the water is passed through the membrane contactor 300 through the water inlet 304 and passed out through the liquid distribution ports 322, it is forced to contact a massive area on an outer surface of the microporous hollow fibers knitted as the membrane. The center baffle 312 forces the water to flow radially and coaxially over the membrane. This directional flow further increases contact. As the hydrophobic membrane fibers are permeable to dissolved gases, the dissolved gases are stripped from water into the hollow core of each fiber. In one embodiment, there may be more than one membrane contactor. In some embodiments, there may be two membrane contactors in series. In yet another embodiment, there may be two membrane contactors in parallel.

A vacuum pump applies vacuum to a lumen side of the microporous hollow fibers 310 in a counter-current flow direction to a flow direction of water to remove dissolved gases in the water through a vacuum exit port 308. A liquid ring pump is preferred, and the complete vacuum system typically will include: a vacuum pump, a liquid trap, a check valve, an air bleed valve, gauges and a complete make-up water line.

Introduction of a vacuum counter to the liquid flow direction may increase the removal efficiency of the dissolved gases by creating a corresponding partial pressure gradient as the driving force. The dissolved gases are stripped out of the water with the application of vacuum into the membrane through microporous, hydrophobic (water-impermeable) hollow-fibers 310 and are transported away. On the inlet side of the membrane contactor 300, the dissolved gases are in a state of equilibrium, according to the temperature and pressure. The counter-flow of vacuum inside the hollow fibers 310 ends the equilibrium. This forces more dissolved gases out of the water.

The oil is degassed in a vacuum chamber 400 that includes a rigid enclosure 402. The vacuum chamber 400 lowers the pressure to reduce the dissolved gases present in the oil as much as possible. The vacuum chamber 400 has a rigid enclosure 402 with an inlet 404, an optional mixer 406 to stir the tank, a vacuum exit port 408, and an outlet 410. The oil with the dissolved gases is let into the vacuum chamber 400 through the inlet 404. The degassed oil is let out through the outlet 410.

To degas, the oil 412 is placed inside the rigid enclosure 402. The volume of the rigid enclosure 402 holding the oil 412 should have enough headspace 414 to accommodate up to three times the original volume of the oil 412. The vacuum chamber 400 will safely seal and operate for a duration of time to reduce the dissolve gas in the oil 412. A vacuum pump 416 applies vacuum to the vacuum chamber 400 to remove the dissolved gases in the oil 412 through a vacuum exit port 408. A liquid ring pump is preferred, and a complete vacuum system typically will include: a vacuum pump 416, a liquid trap 418, a check valve, an air bleed valve, gauges and a complete make-up water line 420. In one embodiment, there may be more than one vacuum chamber.

In some embodiments, there may be two vacuum chambers in series. In yet another embodiment, there may be two vacuum chambers in parallel.

The vacuum chamber may have an outlet 410. After the degassing is achieved, the degassed oil may be allowed to flow either pneumatically or gravimetrically, into the mixing unit 500 through the outlet 410 at atmospheric pressure where it is combined with the degassed water.

In another embodiment, the oil consists essentially of triacylglycerols, diacylglycerols, and $C_8$ to $C_{24}$ fatty acid mixtures derived from seeds, nuts, and cereal grains. In another embodiment, the oil is selected from the group consisting of soybean oil, corn oil, coconut oil, rapeseed oil, canola oil, peanut oil, sunflower oil, olive oil, crambe oil, and mixtures thereof.

The surfactant-free oil-in-water emulsion is prepared with the aid of mechanical action using a mixing unit 500. The degassed water 502 and the degassed oil 504 streams are introduced to the mixing 500 where they are homogenized with mixing technology 506 including either shear or mechanical action. Example mixing technologies include inline mixers or high throughput homogenizers. The inline mixers have a stationary stator and an inside rotor that turns at high speeds. The rotor-stator device should be contained in a casing with an inlet at one end containing both streams and an outlet that leads towards injection processes. Mixing occurs when the inlet is drawn in through one of the mixing heads while the blades rotate and is then expelled at a high velocity through an opening. Similarly, homogenizers of variable sizes may be employed where high-pressure forces the inlet stream through a narrow space to create the desired shear. In one embodiment, there may be more than mixing unit. In some embodiments, there may be two mixing units in series. In yet another embodiment, there may be mixing units in parallel. In an embodiment, the present disclosure provides that the formed colloidal suspension i.e., the surfactant-free oil-in-water emulsion, is stable for a few hours to several days.

In yet another embodiment, the method includes injecting the surfactant-free oil-in-water emulsion into the soil or the aquifer via gravity feeding, induced gas stream, a pump, at least one push rod, at least one injection point, an injection through a well, a French drain type system, deep tilling, an hydraulic injection, a multi-phase inert gas injection, an aerosol injection, a water injection, at least one pump, at least one blower, at least one compressor, tank, at least one tank of compressed gas, at least one compressed gas tank after a blower or compressor, a direct push rig, at least one hand-held injection rod, or a combination thereof. Injecting the surfactant-free oil-in-water emulsion into the soil or the aquifer is performed at a pressure ranging between 10 psi and 1000 psi.

Injecting the surfactant-free oil-in-water emulsion into the soil or into the aquifer causes in-situ remediation of recalcitrant organic and inorganic contaminants. In some embodiments, the recalcitrant organic and inorganic contaminants may be halogenated straight-chain and aromatic hydrocarbons, perchlorate derivatives, explosives, nitrates, oxidized metals, or a combination thereof. The explosives may be selected from a group consisting of nitroaromatic compound, nitramine compounds, nitrate esters, and energetic munitions residuals.

In yet another embodiment, the disclosed method comprises adding the surfactant-free oil-in-water emulsion into a targeted area via mechanical mixing of the soil. In another embodiment, the surfactant-free oil-in-water emulsion is added in an open excavation or trench prior to backfilling.

In another embodiment, the disclosed method further comprises introducing an alkaline catalyst into the soil or the aquifer after injecting the surfactant-free oil-in-water emulsion. The alkaline catalyst includes an alkaline compound selected from potassium-hydroxide or sodium hydroxide. The alkaline compound is dissolved in an alcohol in an amount ranging from 0.1 to 5 wt % of the alkaline compound to form an alkyl oxide solution. The alcohol is selected from ethanol and methanol. A potassium methylate solution is used as the homogeneous alkaline catalyst. The alkyl oxide homogeneous alkaline catalyst when subsequently introduced may cleave the fatty acids of the vegetable oil triglyceride molecule and enhance the subsurface distribution.

In yet another embodiment, the surfactant-free oil-in-water emulsion may be co-introduced into a targeted area via mechanical mixing of soil with vegetable oil fatty acid esters; polyglycerol oleic acid esters; castor oil, ethoxylated, oleate; fatty alcohol alkoxylate; and mixtures thereof to enhance subsurface distribution.

In yet another embodiment, additional materials may be introduced into the soil or into the aquifer before, during, or after injecting the surfactant-free oil-in-water emulsion for further promoting an environment for enhanced anaerobic bioremediation. In some embodiments, the additional-materials may be at least one of a zero-valent metal, iron sulfide reagents, vitamins, isopropanol, glycerol, sodium lactate, potassium lactate, ethyl lactate, methanol, ethanol, a yeast-extract, biological cultures, hydroxides of the alkali and alkaline earth metals, carbonates of alkali earth metals, bicarbonates of alkali earth metals, and mixtures thereof.

Examples

The following examples are intended as illustrative and non-limiting and represent specific embodiments of the present disclosure. The examples describe a method for in-situ remediation of recalcitrant organic and inorganic contaminants in a soil or in an aquifer.

Example 1: Degassing of water: City water was flown through the membrane contactor under 70 mbar vacuum. The membrane unit was started up, and the lowest achievable water flowrate was used. 600 ml of degassed water was collected.

Example 2: Degassing of oil. Six mL of ester fats were added to a vacuum filtration flask and stirred under 70 mbar vacuum in order to degas the oil phase.

Example 3: Mixing degassed water and degassed oil. Six hundred mL of the degassed water was added to the vacuum filtration flask with the degassed oil, and the mixture was stirred for 15 minutes under 70 mbar vacuum to form a surfactant-free oil-in-water emulsion. When mixing the degassed oil and water, air is prevented from entering the mixture.

Example 4: Injecting surfactant-free oil-in-water emulsion into a column. A packed column was used to mimic the environmental medium or the soil. The experiments demonstrated that the surfactant-free oil-in-water emulsion has ability to move through the soil effectively in the bioremediation applications. To stimulate the soil conditions, a column was prepared. A slurry consisting of water and a pre-measured amount (30 g) of Ottawa sand was added to the column in small portions. The column was tapped between each addition to improve the packing efficiency. The column was properly sealed to avoid any leaks. If the sand was not packed tightly enough in the column, it would lose uniformity when water was injected into the column, creating bypassing, crevices, or sinks. If any such conditions were observed, pressure was applied to the column using a syringe flow adaptor. If the pressure drop was not fixed by this, then the column was repacked. The column thus prepared was used to stimulate the soil.

The column was connected to a syringe pump and a manometer to observe any pressure drop or increase in pressure in the column during the test. A dual-valve syringe fitting was used to alternate connections to a withdrawal line and the column line. This allowed for the exclusion of air droplets and maintained the steady state hydrostatic pressure in the column while loading the emulsion.

The degassed water was pumped through the column until the pressure drop stabilized and no air bubbles are detected at the column outlet. A flow rate of 0.3 mL/min was used for this study.

600 mL of non-degassed water was combined with 6 mL of non-degassed ester fats and stirred for 30 minutes at ambient conditions and used as a control.

The formulated ester fat-water mixture, i.e., the surfactant-free oil-in-water emulsion, was then loaded into the syringe pump and injected through the bottom of the column at a flow rate of 0.3 mL/min. 0.5-1 mL aliquots were periodically collected and the % transmittance at 329 nm was analyzed in a Thermo Scientific GENESYS 10s UV-Vis.

UV-Vis works by passing a light beam through a sample solution and measuring the amount of light that remains after passing through the solution (100% transmittance implies all the light passes through, 0% transmittance implies an opaque material/solution).

The variation of % transmittance with pore volume is plotted for a degassed and a non-degassed emulsion (control) as shown in FIG. 9. These are the measured values of the initial emulsion % transmittance tested by the UV-vis directly.

The surfactant-free oil-in-water emulsion passed through the column easily, and this is reflected by the lower % transmittance as compared to the control. The surfactant-free oil-in-water emulsion continued to pass through the column with increasing efficiency, as seen by the drop in % transmittance occurring from a pore volume of 2 to 5. The membrane degassing technology enables to pass more oil through the column, from which it can be inferred that ability of the oil to move increases through the soil in bioremediation applications. FIG. 10 shows the absorbance of the solutions coming out of the column measured using UV-Vis. The absorbance is the opposite of transmittance. Absorbance indicates how much light is captured by a solution. Thus, zero absorbance indicates a clear solution, and the higher the absorbance, the more light is absorbed by the solution. Absorbance of around 10 corresponds to an opaque solution or a solid. Additionally, the absorbance measured by UV-Vis is directly proportional to the concentration of oil in the water. The concentration of the oil in the water after passing through the sand is about 6 times higher for the membrane degassed materials. The dashed lines on the plot show the absorbance of the emulsions directly after preparation (before passing the column). This indicates that the concentration of the oil in the membrane degassed solution passing through the column continually increases to about half the initial concentration. However, due to porous media effects and hydrodynamic considerations, passing these emulsions through the soil and or aquifer matrix at different flowrates or with chase water to increase distribution are viable options. The surface effects is assumed to dominate the outcome of the desired application; where larger generated emulsions will elute faster through a porous media and smaller stable particles will travel more slowly. Likewise, hydrodynamic effects will have the opposite effects on particle size; smaller particles are carried easier than larger particles at the same flowrate. Higher fluid velocities will tend to favor greater subsurface distribution. Porous media is considered the stationary phase where porosity and polarity will affect the distribution of the emulsion. The amount of work and/or degassing are variables in controlling distribution and subsurface behavior.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method for in-situ remediation of recalcitrant organic and inorganic contaminants in an environmental medium, the method consisting of:
    adjusting pH of water to about 11 by adding a buffer to obtain modified water;
    removing dissolved gases from the modified water to form degassed water;
    removing dissolved gases from an oil to form a degassed oil, wherein the oil is selected from the group consisting of soybean oil, corn oil, coconut oil, rapeseed oil, canola oil, peanut oil, sunflower oil, olive oil, crambe oil, and mixtures thereof;
    mixing the degassed water and the degassed oil to form a surfactant-free oil-in-water emulsion, wherein the modified water is characterized to screen double-layer repulsions and reduce electrostatic barrier to droplet coagulation in the surfactant-free oil-in-water emulsion; and
    injecting the surfactant-free oil-in-water emulsion into the environmental medium, thereby producing anaerobic conditions to cause indigenous anaerobic bacteria to biodegrade recalcitrant organic and inorganic contaminants in the environmental medium.

2. The method of claim 1, wherein the environmental medium is soil or groundwater.

3. The method of claim 1, wherein removing dissolved gases from the modified water comprises removing the dissolved gases using a membrane contactor.

4. The method of claim 1, wherein removing dissolved gases from the oil comprises removing the dissolved gases in a vacuum chamber.

5. The method of claim 1, wherein mixing the degassed water and the degassed oil is carried out with a mechanical action.

6. The method of claim 1, wherein forming the surfactant-free oil-in-water emulsion comprises forming a stable colloidal suspension.

7. The method of claim 1, wherein the oil consists essentially of triacylglycerols, diacylglycerols, and $C_8$ to $C_{24}$ fatty acid mixtures derived from seeds, nuts, and cereal grains.

8. The method of claim 1, further comprising injecting the surfactant-free oil-in-water emulsion into an aquifer for in-situ remediation of recalcitrant organic and inorganic contaminants in the aquifer.

9. The method of claim 1, wherein the recalcitrant organic and inorganic contaminants are halogenated straight-chain and aromatic hydrocarbons, perchlorate derivatives, explosives, nitrates, oxidized metals, or a combination thereof.

10. The method of claim 9, wherein the explosives are selected from a group consisting of nitroaromatic compounds, nitramine compounds, nitrate esters, and energetic munitions residuals.

11. The method of claim 1, further comprising co-injecting at least one of a zero-valent metal, iron sulfide reagents, vitamins, isopropanol, glycerol, sodium lactate, potassium lactate, ethyl lactate, methanol, ethanol, yeast-extract, biological cultures, hydroxides of the alkali and alkaline earth metals, carbonates of alkali earth metals, bicarbonates of alkali earth metals, and mixtures thereof before, during, or after injecting the surfactant-free oil-in-water emulsion into the environmental medium.

12. The method of claim 1, further comprising co-injecting polyglycerol oleic acid esters, castor oil, ethoxylated oleate, fatty alcohol alkoxylate, and mixtures thereof to enhance subsurface distribution before, during, or after injecting the surfactant-free oil-in-water emulsion into the environmental medium.

13. The method of claim 1, wherein injecting the surfactant-free oil-in-water emulsion into the environmental medium comprises injecting via at least one injection point, injecting through a well, injecting hydraulically, a multi-phase inert gas injection, an aerosol injection, a water injection, injecting by an induced gas stream, injecting by a pump, injecting by at least one push rod, injecting by a French drain type system, injecting by deep tilling, injecting by at least one blower, injecting by at least one compressor, injecting by at least one tank of compressed gas, injecting by a direct push rig, injecting by at least one hand-held injection rod, injecting via gravity feeding, or a combination thereof.

14. The method of claim 1, wherein injecting the surfactant-free oil-in-water emulsion into the environmental medium comprises injecting at a pressure ranging between 10 psi and 1000 psi.

15. The method of claim 1, further comprising introducing an alkaline compound catalyst into the environmental medium, wherein the alkaline compound is potassium hydroxide or sodium hydroxide, and wherein the alkaline compound is dissolved in an alcohol in an amount ranging from 0.1 to 5% of the alkaline compound to form an alkyl oxide solution.

16. A system for in-situ remediation of recalcitrant organic and inorganic contaminants in an environmental medium, the system comprising:
    a membrane contactor configured for removing dissolved gases from modified water to form degassed water, wherein the modified water has a pH of 11;
    a vacuum chamber configured for removing dissolved gases from an oil to form a degassed oil, wherein the oil is selected from the group consisting of soybean oil, corn oil, coconut oil, rapeseed oil, canola oil, peanut oil, sunflower oil, olive oil, crambe oil, and mixtures thereof;
    a mixing unit configured to mix the degassed water and the degassed oil to form a surfactant-free oil-in-water emulsion; and
    an injection manifold for injecting the surfactant-free oil-in-water emulsion into the environmental medium for in-situ remediation of the recalcitrant organic and inorganic contaminants in the environmental medium.

17. The system of claim 16, wherein the membrane contactor comprises:
    a casing having an inlet and an outlet, wherein the inlet is configured to let in the modified water having dissolved gases, and wherein the outlet is configured to let out the degassed water;
    a center baffle positioned in the casing;
    microporous hollow fibers knitted into a membrane, wherein the membrane is wound around the center baffle, wherein the center baffle forces the modified water to flow radially and coaxially over the membrane; and
    a vacuum pump configured to apply vacuum in a countercurrent flow direction to a flow direction of the modified water to remove dissolved gases in the modified water through a vacuum exit port.

18. The system of claim 17, wherein the microporous hollow fibers are hydrophobic and are permeable to the dissolved gases.

19. The system of claim 17, wherein the injection manifold comprises at least one injection well, a hydraulically actuated injector, a multi-phase inert gas injector, an aerosol injector, a water injector, induced gas stream injector, French drain type injector, deep tilling injector, a pump, a push rod, a blower, a compressor, a compressed gas tank, a direct push rig, a hand-held injection rod, gravity fed injector, or a combination thereof.

\* \* \* \* \*